United States Patent [19]

Kawanami et al.

[11] Patent Number: 5,098,669
[45] Date of Patent: Mar. 24, 1992

[54] STIRRING REACTOR FOR VISCOUS MATERIALS

[75] Inventors: Norio Kawanami; Yoshihiro Ikeda, both of Hyogo; Mitsuo Kamiwano, Kanagawa, all of Japan

[73] Assignee: Kanegafuchi Kagaku Kogyo Kabushiki Kaisha, Osaka, Japan

[21] Appl. No.: 549,050

[22] Filed: Jul. 6, 1990

[30] Foreign Application Priority Data

Jan. 13, 1989 [JP] Japan .................................. 1-7174

[51] Int. Cl.$^5$ ............................................... C08F 2/00
[52] U.S. Cl. ......................... 422/135; 422/225; 422/226; 422/228; 422/229; 366/302; 366/303; 366/307; 366/327; 366/329
[58] Field of Search ............... 422/131, 135, 225, 226, 422/228, 229; 366/302, 303, 307, 327, 329

[56] References Cited

U.S. PATENT DOCUMENTS

| | | | |
|---|---|---|---|
| 446,470 | 2/1891 | Richardson | 366/303 |
| 1,181,205 | 5/1916 | Arnold | 422/228 |
| 2,431,478 | 11/1947 | Hill | 422/224 |
| 2,729,544 | 1/1956 | Pieters | 422/228 |
| 3,709,664 | 1/1973 | Krekeler et al. | 422/225 |
| 3,788,609 | 1/1974 | Toczyski | 366/303 |
| 4,238,159 | 12/1980 | Tielens et al. | 366/327 |
| 4,534,656 | 8/1985 | de Bruyne | 366/306 |
| 4,650,343 | 3/1987 | Doom et al. | 366/327 |
| 4,728,731 | 3/1988 | Raehse | 366/307 |
| 4,838,704 | 6/1989 | Carver | 366/307 |
| 4,909,634 | 3/1990 | Suzuki et al. | 366/307 |

FOREIGN PATENT DOCUMENTS 0063171 10/1982 Fed. Rep. of Germany .
593711 8/1977 Switzerland .
389289 3/1933 United Kingdom .

Primary Examiner—Robert J. Warden
Assistant Examiner—Timothy M. McMahon
Attorney, Agent, or Firm—Armstrong, Nikaido, Marmelstein, Kubovcik & Murray

[57] ABSTRACT

A stirring reactor for a viscous material. The reactor comprises a stirring vessel; a revolvable shaft provided in the vessel; a surface layer stirring vane provided on the revolvable shaft in the vicinity of interface of the gas and the liquid to be stirred; a stirring vane having at least a pair of radially directed multiple portion blades which extend radially towards the inner wall, a first of which blade portions is fastened on the revolving shaft below the upper layer stirring vane and the other of which blade portions extends outwardly radially from said first portion to terminate close to the inner wall of the vessel; and baffle plates provided on the inner side wall at positions substantially parallel to the surface layer stirring vane, and at a height between the heights of any stirring vanes having multiple blades.

7 Claims, 1 Drawing Sheet

U.S. Patent
Mar. 24, 1992
5,098,669
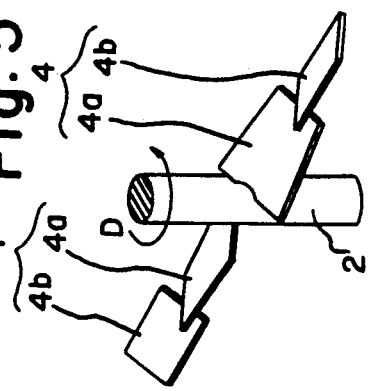
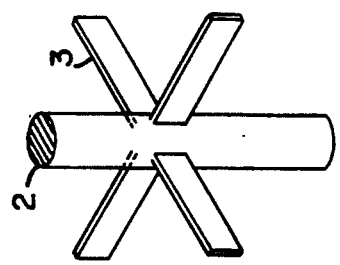
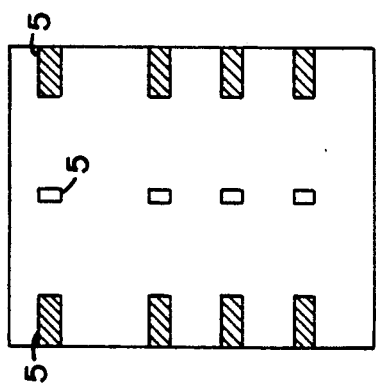
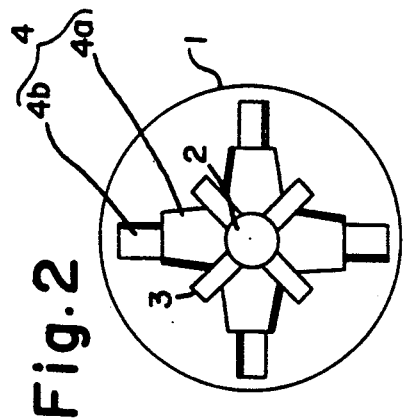
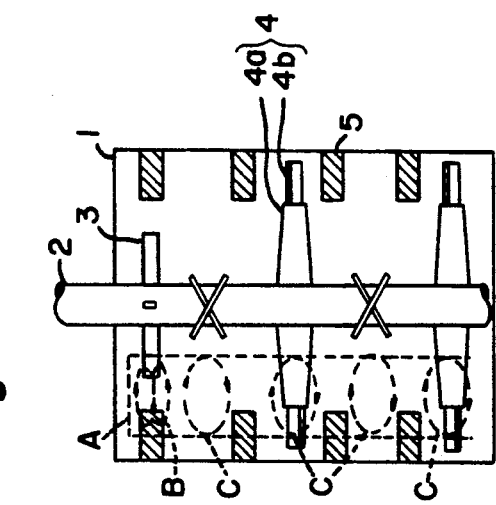

STIRRING REACTOR FOR VISCOUS MATERIALS

BACKGROUND OF THE INVENTION

1. Field of the Invention

The present invention concerns a stirring type reactor, e.g., stirred tank, for viscous materials, particularly a reactor for efficiently carrying out reactions under stirring, of materials having low and moderate viscosity, for example, not higher than 10,000 centipoises.

2. Description of Prior Art

Hitherto, as a stirring type apparatus for viscous materials, a stirring vane having multiple blades, one end of which is secured on a rotating shaft and the other end of which extends in the radial direction of the interior of the stirring vessel, has been proposed.

In the stirring vessel, the viscous material is liable to be stirred along a convection current of the liquid caused by revolution of the vane and a shearing force created in the space between the inner wall of the vessel and the stirring vane.

Thus, generally the stirring vessel provided with the stirring vane having multiple blades is advantageously used since a strong shearing force is easily generated. For example, a specific combination of multiple vanes which are provided on the rotating shaft at different heights, and baffle plates which are provided on the inner wall of the vessel at different heights, the positions of the vanes being different than the positions of the baffle plates, has been widely adopted as well.

In the prior art stirring vessel, when the uppermost vane is positioned at around the gas-liquid interface, a vibration is liable to be caused in the vessel and stirring vanes and the vessel thereby suffers from difficulty in speed-up of revolutions. On the other hand, when the uppermost vane is positioned away from the gas-liquid interface, a so-called dead spot appears in the area of the gas-liquid interface and no stirring occurs at or near the surface of the solution.

Accordingly, the prior art stirring reactor has disadvantages that efficiency of a stirring reaction cannot be improved and stirring is required for a long period of time due to insufficient stirring.

SUMMARY OF THE INVENTION

An object of the present invention, which has been developed in consideration of the above disadvantages, is to provide a stirring reactor which generates sufficient convection mixing and shear mixing simultaneously and, particularly, renews the solution at around the gas-liquid interface.

Another object of the present invention is to provide a stirring reactor which is capable of providing a uniform stirred reaction of a viscous material having from low to medium viscosity without suffering from hazardous vibration in the vessel.

According to the present invention, there is provided a stirring reactor which comprises a stirring vessel, a revolvable shaft placed therein, a stirring vane fastened on the shaft at a position near the gas-liquid interface of the viscous material to be provided in the vessel, stirring vanes fastened at lower positions of the shaft and having multiple blades, these blades extend radially toward and close to the inner wall of the vessel and baffle plates placed on an interior surface of the vessel at different positions with respect to the positions of the vanes having multiple blades.

BRIEF DESCRIPTION OF THE DRAWINGS

FIG. 1 shows a vertical sectional view of one embodiment of a stirring reactor according to the present invention.

FIG. 2 shows a plane view of one embodiment of the stirring vanes for surface stirring and the composite stirring vanes fastened on a revolvable shaft.

FIG. 3 shows a vertical sectional view of one embodiment of the stirring vessel.

FIG. 4 is an oblique view showing one embodiment of the fastened state of the surface layer stirring vane.

FIG. 5 is an oblique view showing one embodiment of the fastened state of the composite stirring vanes.

In the figures, the following symbols denote components as follows:

(1): Stirring vessel,
(2): Revolving shaft,
(3): Surface layer stirring vane,
(4): Composite stirring vane and
(5): Buffle plate.

DETAILED DESCRIPTION OF THE INVENTION

In the stirring reactor according to the present invention there is provided a combination of a surface layer stirring vane and baffle plate which is placed in the stirring vessel at a position corresponding to the position of the blades of said vane, and multiple combinations of composite vanes and baffle plates. The combinations of the latter are provided below the combination of the former to further enhance convection mixing and shearing mixing.

Mixing time for viscous material according to the present invention is remarkably shortened compared with that required for a prior art reactor without the specific combination according to the present invention since a renewal of liquid at around gas-liquid interface where the surface stirring vane is provided, cannot be sufficiently achieved in the prior art reactor.

Further, since sufficient aeration at the gas-liquid interface is caused, volatile matter in the viscous material is easily evaporated, and a gaseous material can be easily dissolved into the viscous material.

The present invention is hereinafter described in detail with reference to various embodiments, which are not to be construed as limiting the scope thereof.

In FIG. 1, a stirring vessel denoted as (1) is provided with a revolvable shaft (2) which is driven by a driving means such as a motor (not shown). The revolvable shaft (2) is provided with a surface mixing vane (3) composed of, for example, a blade having a plate form at a upper side of the vessel, particularly at or around the gas-liquid interface of the viscous material to be stirred in the vessel, and also with a composite vane (4) composed of an inner blade (4a) and an outer blade (4b) at a lower portion of the vessel.

The surface layer stirring vane (3) may be placed at or near the gas-liquid interface as seen in FIG. 1 or may be positioned so that a part of the blade is exposed above the surface of the liquid.

The surface layer stirring vane (3) has two pairs of blades which are symmetrically positioned with respect to the revolvable shaft (2) as a center as shown in FIGS. 2 and 4, however, the plane of these blanes may be positioned either vertically or at an angle with respect to the plane of revolution of the stirring vanes. Further, the surface layer stirring vane, in which the blades may be freely selected with respect to the placement of their positions and their radii, is preferably designed to provide appropriate mixing according to the type and amount of the viscous material to be processed.

In the figures, the surface layer stirring vane is shown as a flat plate type, however, the vane may be of a single-axis or multi-axis screw blade or other type of mixing blade.

The composite stirring vanes (4) are composed of two pairs of blades each of which is symmetrically positioned with respect to the axis of revolution as seen in FIGS. 2 and 5, and are placed on a lower portion of the revolvable shaft (2) in several steps as seen in FIG. 1.

When plural composite stirring vanes (4) are provided, each set of vanes may be placed so that its phase is shifted relative to each other. For example, the phase is shifted 90 degrees as seen in FIGS. 1 and 2. An inner blade (4a) of the composite stirring vane (4) is in the form of, for example, a trapezoid, and is inclined at a specific angle with respect to the horizontal plane of revolution so that one side of the trapezoid is positioned in an upper portion of the revolvable shaft (2) with respect to the revolution direction (D) as shown in FIG. 5.

On the other hand, an outer blade (4b) which is connected to the inner blade (4a) at its end, is inclined in an opposite direction to the inner blade (4a).

The viscous material contained in the stirring vessel (1) is forced downwardly as shown in FIG. 1 in the vicinity of the revolving shaft (2) by the inner blade (4a) and is forced upwardly as shown in FIG. 1 at the inside of the wall face in the vessel by the outer blade (4b), when the revolvable shaft (2) is rotated, along a flow pattern depicted by arrow (A).

In the stirring vessel (1) the baffle plates (5) are provided on the inner wall of the vessel along a line parallel to the axis of the revolvable shaft (2) at a plurality of positions, for example, four baffle plates at various heights, as shown in FIGS. 1 and 3, and are provided at a plurality of positions along the circumferential direction. The baffle plates (5) are aligned vertically with respect to the horizontal plane of revolution or in the same inclined direction as the outer blade (4b) so that the outer blade (4b) of the composite stirring vanes may pass over two or three spaces occupied by the baffle plates. Among the baffle plates (5), the upper most baffle plate is positioned along the extension line of the surface layer stirring vane (3), and the other baffle plates (5) and the composite stirring vanes (4) are positioned so that the outer blade (4b) of the composite stirring vane (4) is situated in an area between two baffle plates (5) whereas the inner blade is situated outside of this area.

The stirring reactor of the present invention is used for stirring the viscous material as follows. The material is charged into the vessel (1). On rotating the revolvable shaft (2), the whole material moves along the rotating direction of rotation of the revolving shaft (2) and some portions of the material in the vicinity of the revolving shaft (2) are moved forward along the line of the surface layer stirring vane and are pushed downwardly at the same time by the movement of the surface layer stirring vane. Subsequently the material is further pushed downwardly with the inner blade (4a) of the composite vane (4). The viscous material on the inner wall of the vessel (1) is forced upwardly by the outer blade (4b).

Thus, the viscous material in convection flow is stirred along the flow pattern shown by the arrow (A) in FIG. 1. Simultaneously, with respect to the viscous material ascending along the inner side wall of the vessel (1), a part of the material impinges on the baffle plate (5) thereby converting its flowing direction towards nearly horizontal. Thus, shear mixing is sufficiently carried out according to a flow pattern depicted by arrow (B) in FIG. 1. In particular, by sufficiently carrying out the shear stirring with the surface layer stirring vane (3) and the corresponding baffle plate (5) depicted as flow pattern (B) in the vicinity of gas-liquid interface, the convection stirring depicted as flow pattern (A) is improved so as to be free from a dead spot of mixing in the vessel (1).

The viscous material stirred in the vessel of the present invention is forced to circulate along the flow patterns A, B and C, which comprise convection mixing at a center and lower part of the vessel, and both convection and shear mixing in the vicinity of the gas-liquid interface, thereby effectively mixing the material uniformly and in a short time, particularly for medium viscous material which is liable to suffer from the dead spot discussed beforehand.

In the stirring reactor of the present invention, in which a passive shear mixing of the material is carried out between the baffle plates (5) and the surface stirring vane (3) and composite stirring vane (4), since the stirring mixing can be efficiently conducted not only for low viscous material but also for medium viscous material, a material which may be changed from low viscosity to medium viscosity due to, for example, polymerization with the stirring, can be continuously treated.

Similarly, when a medium viscous material is dissolved and diluted with a solvent to form a uniformly viscous material, the stirring reactor of the present invention can be effectively used due to its shear stirring phenomenon.

According to the specific construction of the stirring reactor of present invention, a local shear stirring takes place throughout the entire vessel because of the combinations of baffle plates (5) and the surface layer stirring vane (3) and composite stirring vanes (4), and the reactor, therefore, is not only free from a dead spot of stirring in the vicinity of the gas-liquid interface, but is also capable of conducting a required stirring reaction in a short time.

Further, according to the specific construction, since aeration at the gas-liquid interface is sufficiently caused due to the surface stirring vane, the reactor can be used for easily evaporating a volatile matter from the viscous material or easily dissolving or reacting a gaseous matter in the viscous material.

Since the stirring reactor of the present invention can achieve an uniform and highly efficient stirring reaction, it can be used in the treatment of a viscous material to form uniform products in a short time. Further, the stirring reactor is also suitable for treatment of a medium viscous material.

While the invention has been described in detail and with reference to specific embodiments thereof, it will be apparent to one skilled in the art that various changes and modifications can be made therein without departing from the spirit and scope thereof.

What we claim is:

1. A stirring-type reactor for a viscous material comprising a stirring vessel, having an inner wall, for receiving a viscous reaction material; a revolvable shaft provided in the vessel; an uppermost surface layer stirring vane (A) having at least one pair of stirring blades provided on the revolvable shaft for stirring at or near an interface of the gas and the viscous liquid to be stirred in the vessel; at least one composite stirring vane (B) having blades which extend radially toward the inner wall wherein each of said blades comprises a first portion which is fastened on the revolvable shaft below the surface layer stirring vane (A) and a second portion out bound of said first portion extending radially therefrom toward said inner wall of the vessel and terminating adjacent to said inner wall; and baffle plates provided on said inner wall of the vessel, at least one baffle plate being provided at a position on said inner wall at substantially the same height as said surface layer stirring vane (A) and at least one baffle plate being provided at a height which is different relative to any of said composite stirring vanes (B).

2. The stirring-type reactor of claim 1 wherein said surface layer stirring vane has two pairs of stirring blades positioned symmetrically on said revolvable shaft, the stirring blades being plates the planes of which are aligned vertically or obliquely with respect to their plane of revolution around the revolvable shaft.

3. The stirring-type reactor of claim 1 wherein each multiple stirring blade consists of two blades which are aligned at opposite angles relative to their plane of revolution around said revolvable shaft.

4. The stirring-type reactor of claim 1 wherein each baffle plate has a substantially rectangular shape.

5. The stirring-type reactor of claim 1 including a plurality of baffle plates is provided on the inner wall of the vessel along a line substantially parallel to said axis of the revolvable shaft.

6. The stirring-type reactor of claim 5 including a plurality of plates are provided in a circumferential direction along the inner wall of the vessel.

7. The stirrup-type reactor of claim 4 wherein said baffle plate is substantially square.

* * * * *